United States Patent [19]
Castner

[11] 3,862,197
[45] Jan. 21, 1975

[54] COCOA BUTTER COMPOSITION AND METHOD OF MAKING THE SAME

[75] Inventor: Charles S. Castner, Reading, Pa.

[73] Assignee: Schuyler Development Corporation, Reading, Pa.

[22] Filed: May 9, 1973

[21] Appl. No.: 358,653

[52] U.S. Cl................................. 260/418, 260/999
[51] Int. Cl............................................. C11c 1/04
[58] Field of Search................................... 260/418

[56] References Cited
UNITED STATES PATENTS
3,654,327   4/1972   Castner.............................. 260/418

Primary Examiner—Lewis Gotts
Assistant Examiner—Ethel G. Love
Attorney, Agent, or Firm—Buell, Blenko and Ziesenheim

[57] ABSTRACT

A new cocoa butter composition and method of making such composition is provided in which cocoa butter is partially hydrolyzed to convert certain of the glycerides produce free fatty acids by standard saponification techniques and retitred with mineral acid to produce a partially hydrolyzed product having unique properties of storage, ability to penetrate epidermal tissue and carry with it relatively large molecules and unusual properties for skin protection.

6 Claims, No Drawings

COCOA BUTTER COMPOSITION AND METHOD OF MAKING THE SAME

This invention relates to cocoa butter composition and method of making the same and particularly to a method of partially converting the glycerides in cocoa butter to produce free fatty acids and a unique combination of monoglycerides, diglycerides and new triglycerides which are dissimilar to those present in the original materials.

Cocoa butter is known to be essentially a large number of triglycerides in varying amounts. It is also known that it is very difficult to convert all these triglycerides by ordinary methods of saponification for reasons which are not completely understood by me. It is known, however, that cocoa butter fatty acids produced by standard hydrolizing techniques are prone to spoilage by mold, mildew and bacterial infestations. Glyceride materials recovered from cocoa butter by standard saponification techniques are obtained by adding alkali in an amount in excess of that required to react with all of the triglyceride of the cocoa butter at a pH of about 14.

The converted fatty acids and glyceride substances produced by the method of this invention are prepared by adding an amount of alkali insufficient to produce complete saponification and then reacidifying with mineral acid to produce free fatty acids and certain conversions of glyceride components. The product of this invention is not only physically different from conventional products prepared by standard hydrolizing techniques but the resultant substances appear to have the unique property of carrying a great variety of medicinal agents through or at least deep into the epidermal and subdermal tissues. For example, various proteins and certain chemical salts can be dissolved or at least completely dispersed in the material of this invention and when applied to the surface of the skin the resultant compound appears to be carried through the skin surface. Similarly aliphatics, earth borates and chlorinated phenols and other germicidal agents are readily dissolved and act as highly effective skin cleansing and purifying agents as, for example, in bovine teat dips, surgical soaps, cosmetic bases, shampoos, etc.

Material produced according to this invention has, in addition, a uniquely different physical character. It is a firm creamy mass which can be stored without degrading in the presence of mold, mildew and bacterial infestations. When warmed and diluted with equal amounts of water in excess of 98°F. it can be readily pumped into mixing and storage containers.

Preferably I melt cocoa butter and add potassium hydroxide or similar caustic in the presence of hot water at a temperature in the range 160°F. to 212°F. The amount of alkali added is controlled to provide a pH of about 10.5 to 11.5, midway between the extremes of the alkaline range of the pH scale. This mixture is held at elevated temperature and stirred continuously until a major part of (approximately 90%) the saponification reaction is completed. When partial saponification is completed, the mass is acidified by slow addition of hydrochloric acid accompanied by vigorous stirring to a pH in the acid range, e.g., 4.5 to 5.0 pH. The resulting mass is then washed with alternative additions of hot and cold water "washing" solutions to remove soluble and insoluble salts and excess hydrochloric acid.

it is preferable that the free acids be formed above pH 4.5 and preferably in the range of pH 5.5 and 6.0 pH. Above 6.5 the product is insufficiently acidified. Below 4.5 pH the product is prone to excessive hydration and retains too many acid salts requiring additional washing.

In the foregoing general statement of this invention certain objects, purposes and advantages have been outlined. Other objects, purposes and advantages will be apparent from a consideration of the following examples showing certain preferred practices according to this invention.

EXAMPLE I

Thirty pounds of cocoa butter was melted by adding it to a reactor vessel containing 75 pounds of hot water (160°–212°F.). A solution of potassium hydroxide was added. The reaction mixture was stirred constantly and was checked for pH and level of hydrolysis after each addition. Successive checks for pH and level of hydrolysis were made every 15 minutes until the pH reached 10.5. The pH and progress of hydrolysis was monitored by removing a small portion of reaction mixture to a beaker of water and observing the result. When the desired pH of 10.5 was reached and thus the desired level of partial saponification is complete, the material is white in color and completely dissolved. If incomplete the unreacted butter remains brown and is readily seen on the surface of the beaker.

When the desired pH of 10.5 was reached, the mass was blended with sufficient hydrochloric acid to provide and maintain a pH of 4.5 with constant agitation. The resulting product was then washed with water to remove KOH and any other salt in the solution.

The resulting product was a milk white creamy paste, soft to the touch and easily handled. A typical analysis is:

| | |
|---|---|
| Palmitic and Palmitoleic acids and related glycerides | 22 to 26% |
| Stearic acid | 21 to 23% |
| Oleic, Linoleic and Linolenic acids and related glycerides | 50% |
| Arachidic acid | 1% |

EXAMPLE II

A similar amount of cocoa butter and sodium hydroxide were added to hot water in a reactor as in Example I. The partial saponification and retitering steps were followed in the same manner and with the same retitering materials as in Example I - i.e. hydrochloric acid. The partially hydrolyzed acids were removed as a white, soft, creamy mass. This run was operated in a continuous fashion in the same manner described in the batch operation of Example I. The results were essentially the same in both cases.

Since potassium hydroxide and sodium hydroxide were used in the two saponification cycles cited in the general description it appears that the salt produced by reaction would be either potassium chloride or sodium chloride when the hydrochloric acid is added. In either case the salt residues, both soluble and insoluble, are easily removable by washing.

The resultant product of this invention is a partially hydrolyzed cocoa butter which carries with it from about 45 to 50% of the free fatty acids present in unreacted cocoa butter and the converted glycerides (mono, di and triglycerides) comprise more than 48% of the resultant mass. The combined residue will retain an average of less than 5% water.

This product has unique properties in that it does not degrade upon cooling as does fully hydrolyzed cocoa butter but remains in a firm creamy state which can be pumped and otherwise readily handled when emulsified in equal volumes of water at more than 98°F. It has remarkable divergent capabilities of skin penetrancy coupled with the ability to carry larger molecules with it. Finally, certain of its multiple components have excellent properties as skin coatings to reduce sunburn and chapping.

While I have set out certain preferred practices of my invention in the foregoing specification it will be understood that this invention may be otherwise embodied within the scope of the following claims.

I claim:

1. The method of recovering cocoa butter fatty acids comprising the steps of:
   a. admixing cocoa butter in water at elevated temperature with an alkali metal hydroxide to provide a pH of 10.5 to 11.5;
   b. agitating the mixture until partial saponification of the cocoa butter at the desired pH level has been complete;
   c. adding hydrochloric acid to the partially hydrolyzed cocoa butter with constant agitation to a maintained pH of between 4.5 and 6.0;
   d. washing the unreacted cocoa butter and cocoa butter reaction product to remove insoluble and soluble salts; and
   e. collecting the washed partially hydrolyzed cocoa butter product.

2. The method as claimed in claim 1 wherein the alkali metal hydroxide is sodium hydroxide.

3. The method as claimed in claim 1 wherein the added acid is hydrochloric acid.

4. The method as claimed in claim 1 wherein the cocoa butter and its reaction product are maintained at a temperature between 160°F. and 212°F. during the entire reaction.

5. A cocoa butter fatty acid mass having a pH between 5.0 and 6.0 and about 45 to 50% of the free fatty acids present in an unreacted cocoa butter component and characterized by being a white creamy soft pumpable mass.

6. The method as claimed in claim 1 wherein the alkali metal hydroxide is potassium hydroxide.

* * * * *